United States Patent [19]
Jang et al.

[11] Patent Number: 5,540,634
[45] Date of Patent: Jul. 30, 1996

[54] HYDRAULIC CONTROL SYSTEM OF FOUR-SPEED AUTOMATIC TRANSMISSION FOR AUTOMOTIVE VEHICLE

[75] Inventors: Jaeduk Jang; Dokee Lim, both of Kyungki-do, Rep. of Korea

[73] Assignee: Hyundai Motor Company, Rep. of Korea

[21] Appl. No.: 356,578

[22] Filed: Dec. 15, 1994

[30] Foreign Application Priority Data

Dec. 17, 1993 [KR] Rep. of Korea .................. 93-28245

[51] Int. Cl.⁶ .................. F16H 61/06; F16H 61/08
[52] U.S. Cl. .......................... 477/131; 477/155
[58] Field of Search .................. 477/130, 131, 477/132, 133, 155

[56] References Cited

U.S. PATENT DOCUMENTS

| | | | |
|---|---|---|---|
| 3,750,495 | 8/1973 | Ho et al. | 477/131 |
| 4,558,612 | 12/1985 | Shimizu et al. | 477/97 |
| 4,949,597 | 8/1990 | Ueki et al. | 47/130 |
| 5,020,393 | 6/1991 | Kuwayama et al. | 477/155 |
| 5,090,271 | 2/1992 | Hayasaki | 477/155 |
| 5,159,856 | 11/1992 | Yoshimura et al. | 477/161 |
| 5,367,922 | 11/1994 | Jan | 475/123 |

Primary Examiner—Rodney H. Bonck
Assistant Examiner—Sherry Estremsky
Attorney, Agent, or Firm—Finnegan, Henderson, Farabow, Garrett & Dunner, L.L.P.

[57] ABSTRACT

A hydraulic control system of a four-speed automatic transmission whereby second-to-fourth skip shifting or fourth-to-second skip shifting is possible. Line pressure is controlled variably to improve the power train efficiency and the response of shifting time during gear shifting. The exhaust port of the pressure control valve, which is controlled by the line pressure varying solenoid valve according to a duty ratio, is selectively opened to control line pressure. First and second pressure control solenoid valves are controlled according to a duty ratio such that the shift valves are controlled by drive pressure and speed line pressure.

10 Claims, 12 Drawing Sheets

FIG.12

| MODE | S1 | S2 | S3 | S4 | S5 | REMARKS |
|------|-----|-----|------|------|------|---------|
| N→D | ON | ON | ON | OFF | DUTY | |
| N→R | OFF | OFF | DUTY | OFF | DUTY | |
| 1ST | ON | ON | ON | OFF | DUTY | |
| 1→2 | ON | OFF | DUTY | OFF | OFF | |
| 2ND | ON | OFF | OFF | OFF | DUTY | |
| 2→3 | OFF | OFF | DUTY | DUTY | OFF | |
| 3RD | OFF | OFF | OFF | OFF | DUTY | EMERGENCY MODE |
| 3→4 | OFF | ON | DUTY | OFF | OFF | |
| 4TH | OFF | ON | OFF | OFF | DUTY | |
| 2→4 | OFF | ON | OFF | DUTY | OFF | SKIP SHIFTING |
| 4→2 | ON | OFF | OFF | DUTY | OFF | SKIP SHIFTING |
| REV | OFF | OFF | OFF | OFF | OFF | |
| N→LOW | ON | ON | DUTY | OFF | DUTY | |

HYDRAULIC CONTROL SYSTEM OF FOUR-SPEED AUTOMATIC TRANSMISSION FOR AUTOMOTIVE VEHICLE

BACKGROUND OF THE INVENTION

1. Field of the Invention

The present invention relates to a hydraulic control system of a four-speed automatic transmission for an automotive vehicle, and in particular to a hydraulic control system of an automatic transmission in which second-to-fourth skip shifting or fourth-to-second skip shifting is possible, line pressure is controlled variably to improve the power train efficiency, and shift feeling is improved when shifting from a neutral mode to a drive mode or a reverse mode.

2. Description of the Prior Art

A conventional vehicle automatic transmission has a torque converter and a multiple stage transmission gear mechanism connected with the torque converter. The gear mechanism includes hydraulically applied friction members for selecting one of the gear stages of the transmission gear mechanism in accordance with vehicle operating conditions. Control valves direct fluid pressure to the friction members. A hydraulic pump produces pressure required to operate the friction members and control valves.

A commonly used vehicle automatic transmission has a hydraulic torque converter which generally includes a pump impeller, a turbine runner with an output shaft member, and a stator disposed between the pump impeller and the turbine runner. The pump impeller is connected with and driven by an engine output shaft. Fluid is circulated by the engine driven pump impeller through the turbine runner with the aid of the stator. The stator deflects the fluid from the turbine runner to a direction where the fluid flow does not disturb the rotation of the pump impeller when the fluid flows into the pump impeller.

An automatic shift is performed by operating the friction members, such as clutches or a kickdown brake, at each shift change. A manual valve is designed to be fed with fluid from a hydraulic pump and to feed the fluid to a shift control valve. Ports of the manual valve are selectively opened or closed by selection of a position of a selector lever.

In the case of a 4-speed automatic transmission, the shift control valve is operated by an electronic control system. In a conventional automatic transmission control system, because hydraulic pressure is fed in two modes, a drive range and a reverse range, it is difficult to improve the pump efficiency and the power train efficiency. Furthermore, it is extremely difficult to make a skip shifting which results in a slow shifting response.

SUMMARY OF THE INVENTION

Accordingly, the objects of the present invention are to provide a four-speed automatic transmission system of a vehicle with improved shifting responsiveness, power train efficiency, hydraulic pump efficiency, and shift feeling when shifting a manual valve from a neutral mode to a drive mode or a reverse mode. A further object of the invention is to provide a four-speed automatic transmission capable of skip shifting from second speed to fourth speed and vice versa.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention provides a hydraulic control system for an automatic transmission. The control system includes a hydraulic pump for pressurizing fluid. A torque converter transmits power to the transmission. A pressure regulating valve connected to the hydraulic pump varies line pressure according to an operation of a line pressure varying solenoid valve. The solenoid valve is controlled according to a duty ratio by a TCU (transmission control unit). A reducing valve connected to the hydraulic pump reduces a fluid flow. A manual valve operated by a shift select lever feeds pressure from the pump to a drive pressure conduit at a "D" range and a reverse pressure conduit at an "R" range. The "D" range includes a plurality of speeds. A shift control valve connects to the drive pressure conduit for feeding drive pressure to each of two shift valves by an operation of two shift control solenoid valves which are ON/OFF controlled by the TCU. A rear clutch release valve feeds pressure from the drive pressure conduit to a rear clutch at a first, a second, and a third speed of the "D" range. A first pressure control valve is controlled by a first pressure control solenoid valve according to a duty ratio in order to feed the pressure from the drive pressure conduit to a kick down servo at the second and fourth speeds of the "D" range. A second pressure control valve is controlled by a second pressure control solenoid valve according to a duty ratio in order to feed pressure to a front clutch and to an end clutch at the third speed of the "D" range. A 1–2 shift valve feeds pressure to a kickdown servo in accordance with a second speed line pressure of the shift control valve. An end clutch valve feeds pressure to the front clutch and the end clutch in accordance with the second speed line pressure. A 2¾–3 shift valve releases pressure from the kickdown servo and feeds pressure to the front clutch and is operated in accordance with a third and a fourth speed line pressure of the shift control valve.

In another aspect, the present invention provides the hydraulic control system wherein, at the first speed of the "D" range, the first pressure control solenoid valve is controlled to an ON state (duty ratio 100%) in order to keep pressure in the drive pressure conduit from flowing into the 1–2 shift valve, and the second pressure control solenoid valve is controlled to an OFF state.

In still another aspect, the present invention provides the hydraulic control system described above wherein the first pressure control solenoid valve is controlled to an OFF state (duty ratio 100%) at the second speed of the "D" range in order to feed pressure in the drive pressure conduit, via the 1–2 shift valve, to the kickdown servo to apply the kickdown servo.

In a further aspect, the present invention provides the hydraulic control system wherein, in order to perform a second-to-fourth skip shifting, a second, a third, and a fourth speed line of the shift control valve are opened and the first pressure control solenoid valve is controlled according to a low duty ratio in order to feed pressure from the drive pressure conduit to the 1–2 shift valve. The 1–2 shift valve is controlled by the second speed line pressure in order to feed the drive pressure to the kickdown servo. The third and fourth speed line pressure are fed to the 2¾–3 shift valve such that the valve spool of the 2¾–3 shift valve is displaced, causing some of the fluid pressure in the third speed line to be fed, via second pressure control valve and the end clutch valve, to the end clutch. The rear clutch pressure is released by the rear clutch release valve.

In a still further aspect, the present invention provides the hydraulic control system as described above wherein, in order to perform a fourth-to-second skip shifting, a second speed line of the shift control valve is opened to control the 1–2 shift valve such that pressure is directed to the kickdown servo and pressure is fed to the rear clutch directly. End clutch pressure is released by the second pressure control valve.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the invention and together with the description, servo to explain the principles of the invention.

BRIEF DESCRIPTION OF THE DRAWINGS

FIG. 12 is a table showing the operation status of the solenoid valve used in the hydraulic control system shown in FIG. 1 for each mode.

DESCRIPTION OF THE PREFERRED EMBODIMENT OF THE INVENTION

Reference will now be made in detail to the present preferred embodiment of the invention, an example of which is illustrated in the accompanying drawings. Wherever possible, the same reference numbers will be used throughout the drawings to refer to the same or like parts.

The Control System Components and their Interconnection

Figure 1:
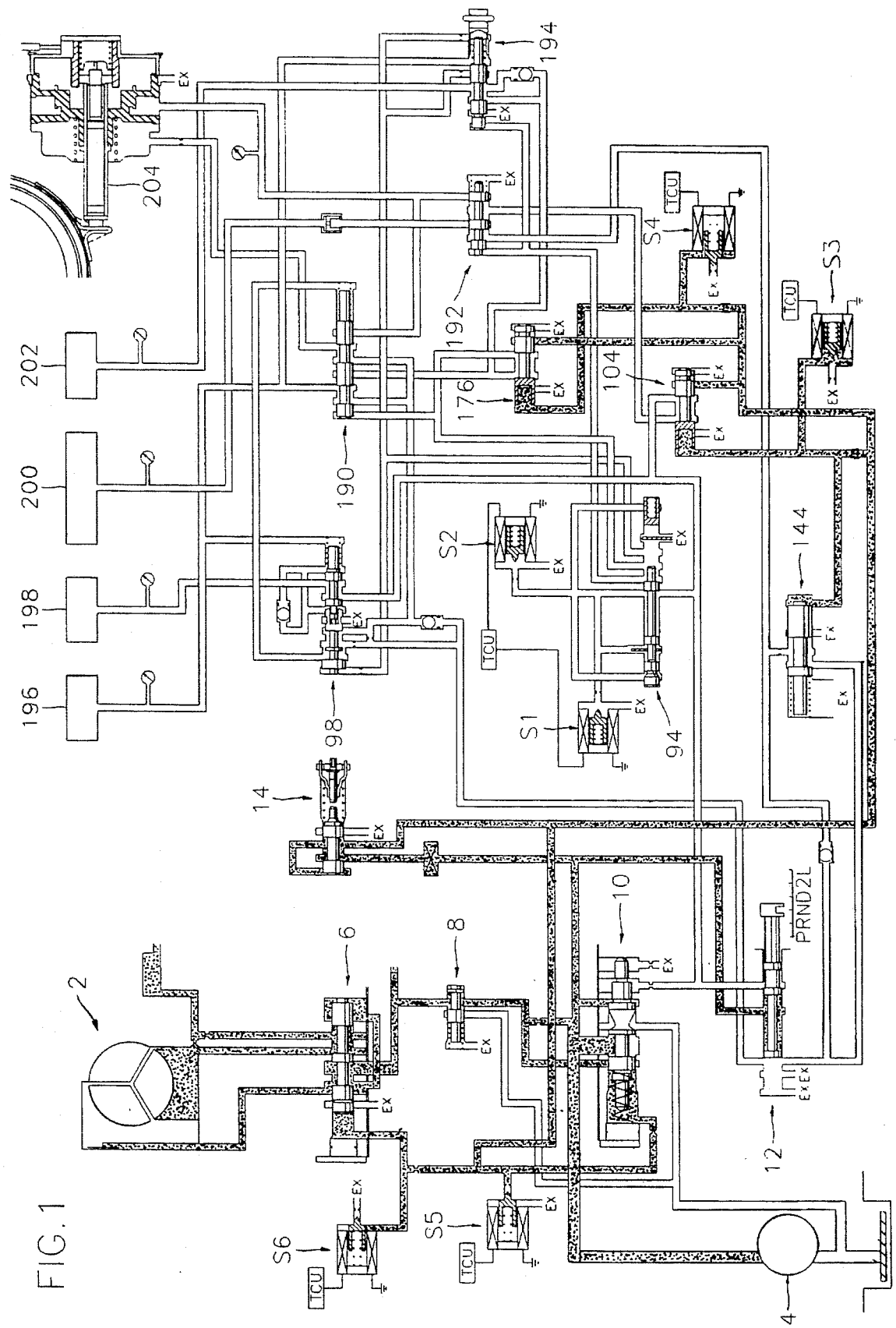
FIG. 1 is a hydraulic circuit diagram of an embodiment of the hydraulic control system according to the present invention in the neutral "N" mode of operation.

A preferred embodiment of the hydraulic control system according to the present invention is shown in FIG. 1. In FIG. 1, the control system is depicted in a neutral state, or "N" range. The control system can be divided for descriptive purpose into three sections—a first section including the line pressure control and the damper clutch control (FIG. 2), a first shift control section (FIG. 3), and a second shift control section (FIG. 4). The components of each of these sections will now be described in detail.

Figure 2:
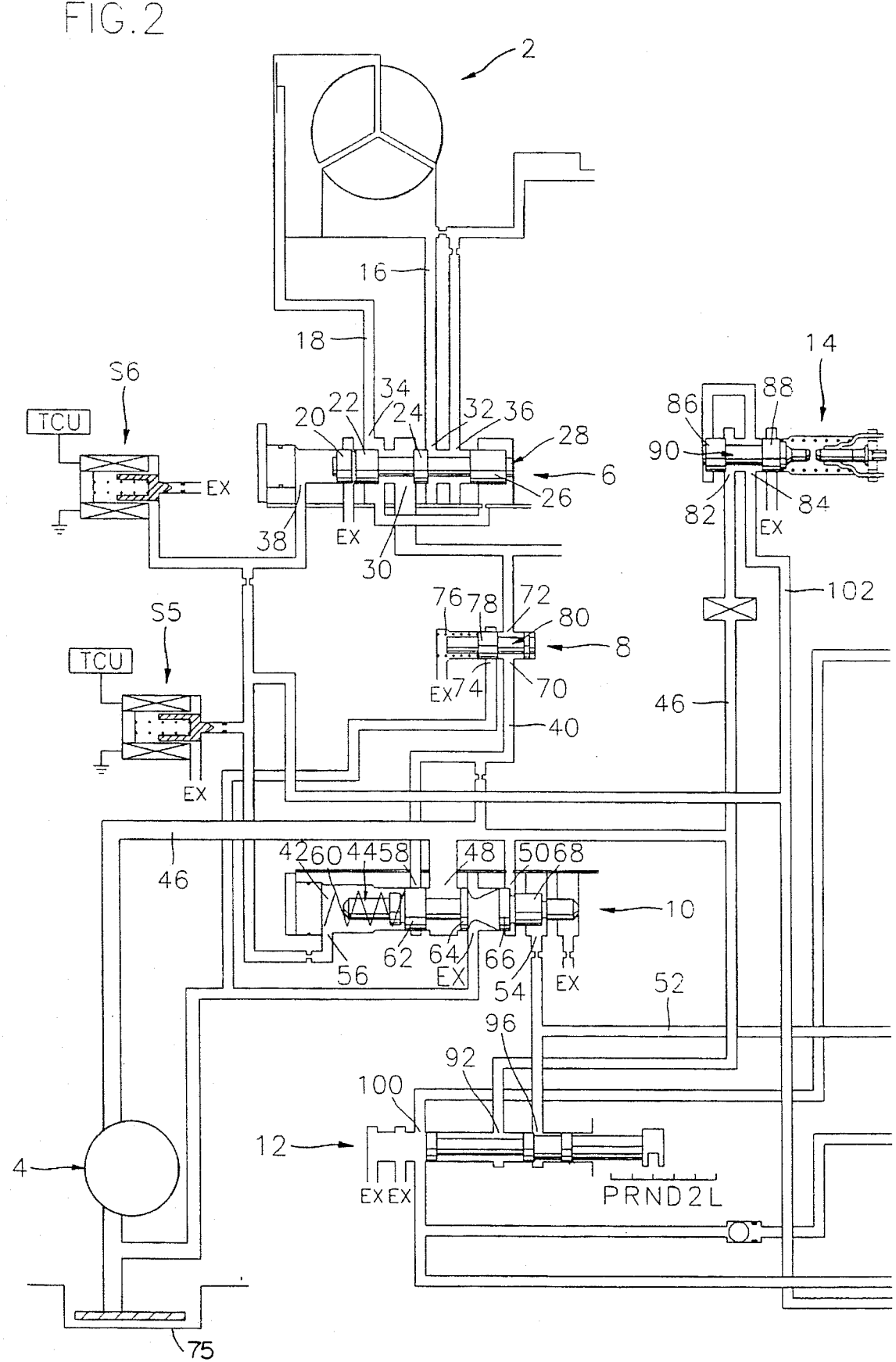
FIG. 2 is an enlarged circuit diagram of the line pressure control section and the damper clutch control section of the system shown in FIG. 1.

As shown in FIG. 2, the major components of the line pressure control and the damper clutch control sections of the hydraulic control system include a torque converter 2, a hydraulic pump 4, a converter clutch regulator valve 6, a torque converter control valve 8, a pressure regulating valve 10, a manual valve 12, and a reducing valve 14. Torque converter 2 transmits power from the engine to an input shaft of the transmission. Hydraulic pump 4 includes a drive gear (not shown) connected to a pump drive hub (not shown) of torque converter 2 and a driven gear (not shown) driven by the drive gear. Converter clutch regulator valve 6 varies oil flow from hydraulic pump 4 to apply/release the damper clutch of torque converter 2. Torque converter control valve 8 regulates the torque converter pressure constant. Pressure regulating valve 10 varies line pressure when converting the mode from the neutral "N" range to a drive "D" range or a reverse "R" range.

Converter clutch regulator valve 6 is operated by a damper clutch solenoid valve S6 which is controlled by a transmission control unit TCU. Pressure regulating valve 10 is operated by a line pressure varying solenoid valve S5 which is controlled by the TCU.

Pressure regulating valve 10 is connected to manual valve 12 and to reducing valve 14. A shift select lever operates manual valve 12. Reducing valve 14 reduces the line pressure.

Converter clutch regulator valve 6 is connected to torque converter 2 via a clutch apply line 16 and a clutch release line 18 for operating the damper clutch in torque converter 2. Converter clutch regulator valve 6 includes a valve spool 28 having first, second, third, and fourth lands 20, 22, 24 and 26 respectively and a valve body having first, second, third, fourth, and fifth ports 30, 32, 34, 36, and 38 respectively. The line pressure regulated in pressure regulating valve 10 is fed to first port 30 through a conduit 40. Pressure reduced in reducing valve 14 is fed to fifth port 38 such that, when damper clutch control solenoid valve S6 is controlled to an OFF state, valve spool 28 is moved towards the right.

Pressure regulating valve 10 regulates the oil flow produced by hydraulic pump 4. Pressure regulating valve 10 includes a pressure detecting chamber 42 and a valve spool 44 therein. Pressure detecting chamber 42 has first and second ports 48 and 50 receiving fluid pressure from pump 4 via a line pressure conduit 46. A third port 54 receives fluid pressure from manual valve 12 via a drive pressure conduit 52. Fourth and fifth ports 56 and 58 respectively feed or exhaust pressure in pressure detecting chamber 42 according line pressure varying solenoid valve S5.

The valve spool 44 is biased by a spring 60 and includes a first land 62 for selectively obstructing fifth port 58, a second land 64 for selectively obstructing exhaust port Ex, a third land 66 on which pressure coming through second port 50 acts, and a fourth land 68 on which pressure coming through third port 54 acts.

Torque converter control valve 8 is installed in a conduit 40 and connects pressure regulating valve 10 with converter clutch regulator valve 6. Torque converter control valve 8 includes first, second, and third ports 70, 72, and 74. Some of the fluid enters port 70 and exits port 72 to thereby be fed to converter clutch regulator valve 6, and some of the fluid exits port 74 to thereby be returned to oil pan 75. A valve spool 80 having a land 78 and biased by a spring 76 selectively returns some fluid entering first port 70 through third port 74 to oil pan 75.

Line pressure conduit 46 connects to reducing valve 14 as well as pressure regulating valve 10, torque converter control valve 8, and manual valve 12. Reducing valve 14 includes a first port 82 communicating with line pressure conduit 46, and a second port 84 for feeding some fluid coming through first port 82 to converter clutch regulator valve 6 and pressure regulator valve 10. Reducing valve 14 further includes a valve spool 90 having first and second lands 86 and 88 for selectively opening and cleaning these ports.

As mentioned, a branch of line pressure conduit 46 is directed to manual valve 12 at a first port 92 of manual valve 12. A second port 96 of manual valve 12 feeds pressure coming through first port 92 to a shift control valve 94, to be described herein, at drive "D", second "2" and low "L" ranges. A third port 100 feeds pressure to a rear clutch release valve 98, also to be described further herein, at the "R" range.

A reduced-pressure line 102 connects at one end to second port 84 of reducing valve 14 and at the other end to a first pressure control valve 104 to reduce shock during gear shifting by regulating pressure during shifting.

Figure 3:
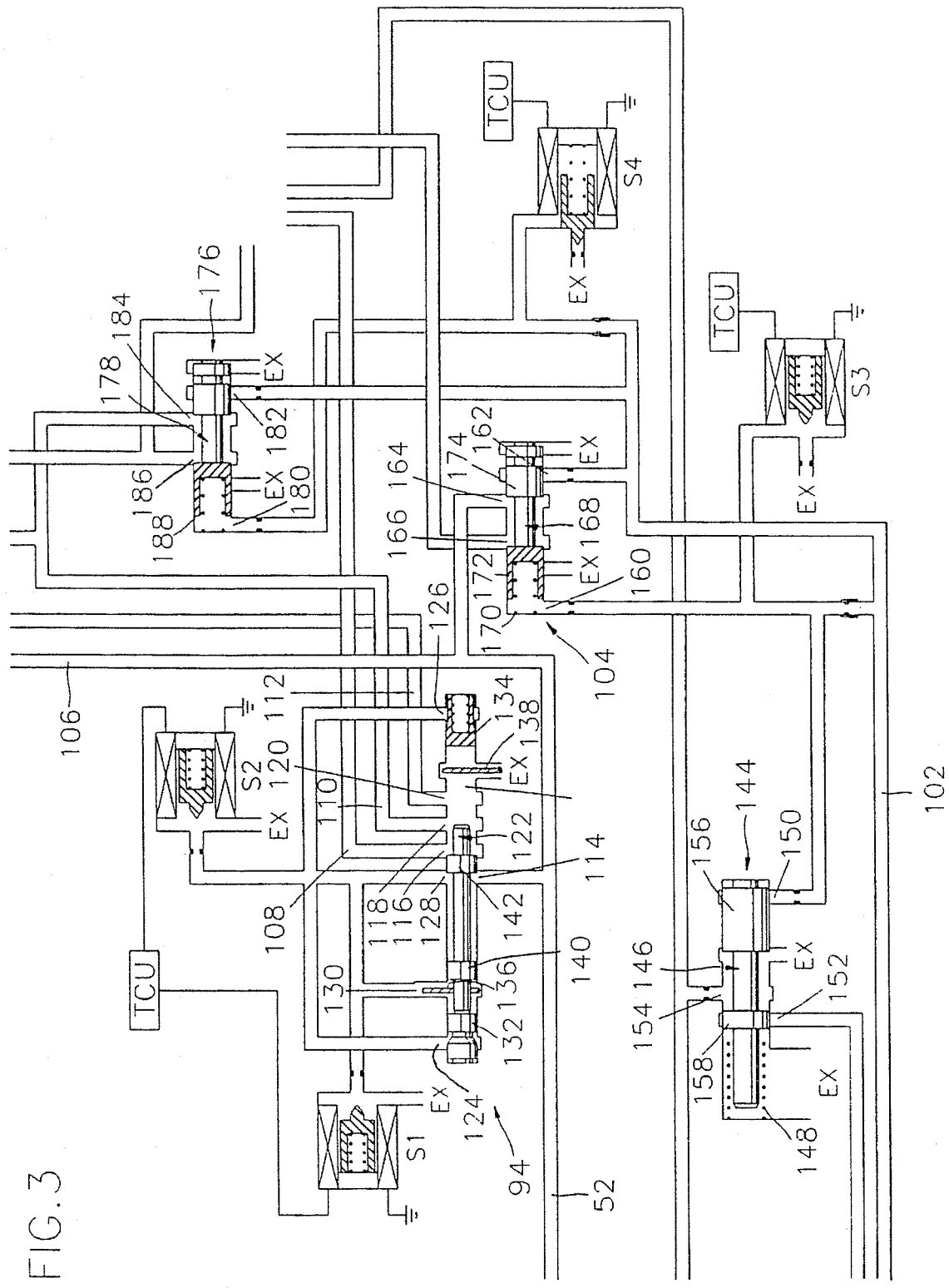
FIG. 3 is an enlarged circuit diagram of the first shift control section of the system shown in FIG. 1.
Figure 4:
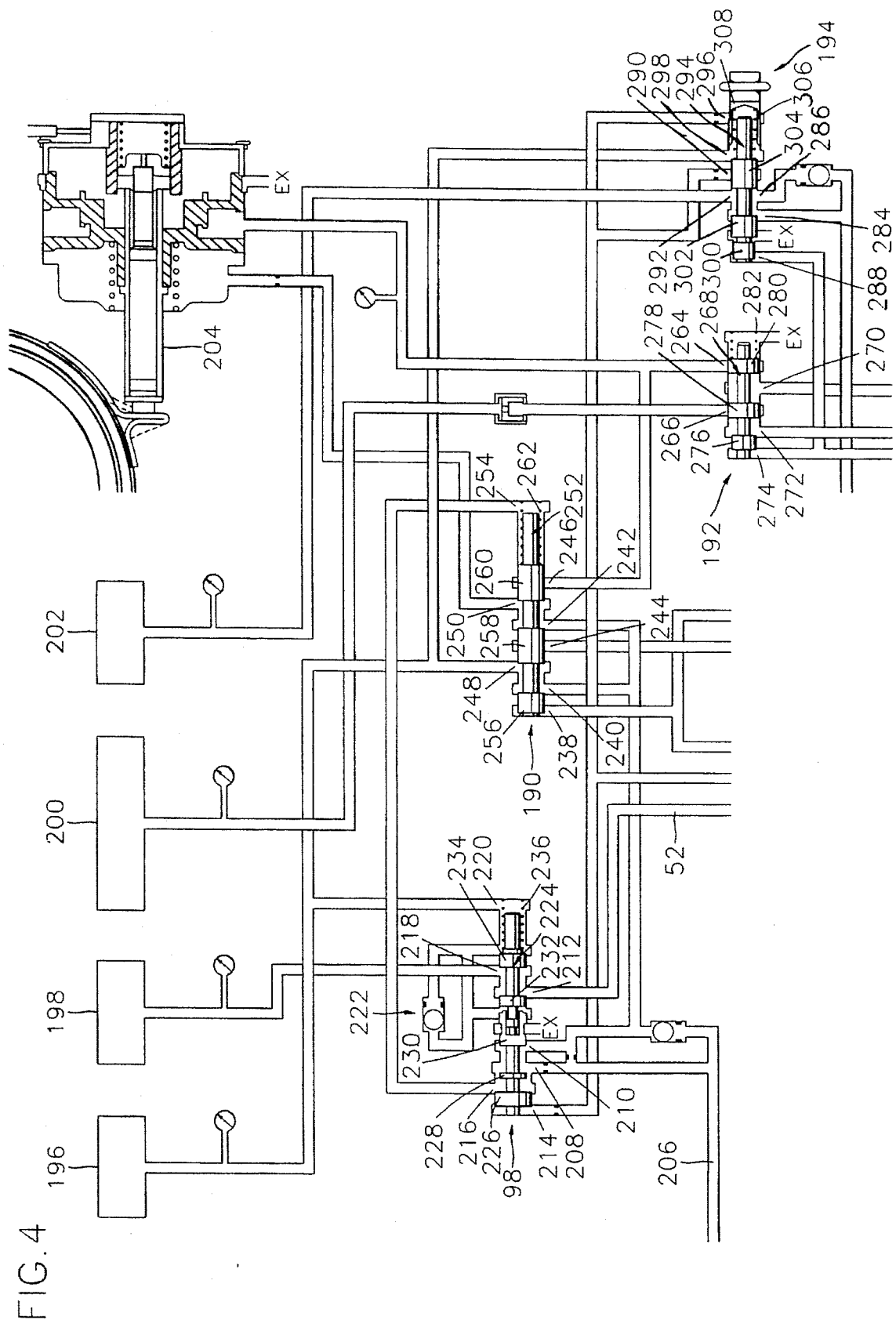
FIG. 4 is an enlarged circuit diagram of the second shift control section of the system shown in FIG. 1.

Referring next to FIG. 3, the major components of the first shift control section of the hydraulic control system according to the present invention and as embodied herein will now be described. These components include shift control valve 94, first pressure control valve 104, a neutral-reverse N-R control valve 144, and a second pressure control valve 176. Four solenoid valves are controlled by the TCU to direct the operation of these valves. The solenoid valves are shift control solenoid valves S1 and S2, first pressure control solenoid valve S3, and second pressure control solenoid valve S4.

Drive pressure conduit 52 connects manual valve 12 with shift control valve 94. Shift control solenoid valves S1 and S2, which are ON/OFF controlled by the TCU, direct pressure in conduit 52 to a plurality of friction elements, namely a front clutch 196, rear clutch 198, low/reverse brakes 200, end clutch 202, and kickdown servo 204.

In order to apply these friction members selectively, drive pressure conduit 52 is connected to a first speed line 106 directly and to second, third, and fourth speed lines 108, 110, and 112 via shift control valve 94.

The shift control valve 94 includes a first port 114 communicating with drive pressure conduit 52, a second port 116 connected to second speed line 108, a third port 118 connected to third speed line 110, and a fourth port 120 connected to fourth speed line 112. To displace a valve spool 122 within shift control valve 94, fifth and sixth ports 124 and 126 direct pressure coming through first port 114 toward the left and right sides of valve spool 122 according to shift control solenoid valve S1 and S2. Fifth and sixth ports 124 and 126 receive fluid pressure via a seventh port 128, which is also connected to an eighth port 130.

The valve spool 122 includes plugs 132 and 134, which are installed respectively at fifth and sixth ports 124 and 126. The ON/OFF control of shift control solenoid valves S1 and S2 displace these plugs and pushes valve spool 122 towards the right or left. Stoppers 136 and 138 are installed respectively at eighth port 130 and an exhaust port Ex to limit the displacement of plugs 132 and 134. Stoppers 136 and 138 are thin plates with central holes. Ends of valve spool 122 can penetrate through the holes.

The valve spool 122 further includes a first land 140 and a second land 142 smaller than first land 140. Second land 142 selectively obstructs second, third or fourth port 116, 118, or 120 to selectively feed pressure to second, third, or fourth speed lines 108, 110, or 112.

N-R control valve 144 connects to reducing valve 14 and receives fluid from reduced-pressure line 102. N-R control valve 144 reduces shock during shifting by gradually raising pressure fed to the friction element when driving in reverse. A valve spool 146 is located within N-R control valve 144 and is displaced by the ON/OFF duty control of first pressure control solenoid valve S3. Valve spool 146 is normally biased towards the right in the figures by a spring 148. N-R control valve 144 has a first port 150 connected to reduced-pressure line 102 for receiving pressure controlled by first pressure control solenoid valve S3. A second port 152 connects to third port 100 of manual valve 12 to receive the line pressure. A third port 154 feeds pressure coming through second port 152 to a 1–2 shift control valve 192 to be described further herein. Valve spool 146 includes a first land 156 on which pressure coming through first port 150 acts, and a second land 158 for selectively obstructing second port 152.

As well as connecting to N-R control valve 144, reduced-pressure line 102 also connects to first pressure control valve 104 at first and second ports 160 and 162. Pressure fed to first port 160 is controlled by first pressure control solenoid valve S3 connected thereto. First pressure control valve 104 further includes a third port 164 receiving fluid pressure from drive pressure conduit 52, and a fourth port 166 for feeding pressure coming through third port 164 to 1–2 shift control valve 192.

A valve spool 168 is located within first pressure control valve 104 and is biased by a spring 170. Valve spool 168 includes a first land 172 on which pressure coming through first port 160 acts, and a second land 174 on which pressure coming through second port 162 acts.

Second pressure control valve 176 includes first and second ports 180 and 182 receiving fluid pressure from reduced pressure line 102. A valve spool 178 is located within second pressure control valve 176 and is biased by a spring 188.

Second pressure control solenoid valve S4 connects to and controls fluid pressure to second port 182 of second pressure control valve 176. Second pressure control solenoid valve S4 does not control fluid pressure fed to second port 182. Through control of pressure to port 180 by solenoid valve S4, displacement of valve spool 178 is controlled.

Second pressure control valve 176 also has a third port 184 communicating with and receiving pressure from third speed line 110 of shift control valve 94. A fourth port 186 feeds pressure coming through third port 184 to 2¾–3 shift control valve 190, to be described further herein. These ports are opened or closed by spring 188 biasing valve spool 178 and pressure coming through first port 180 to displace valve spool 178.

Referring next to FIG. 4, the major components of the second shift control section of the hydraulic control system according to the present invention and as embodied herein will now be described. These components include rear clutch release valve 98, 2¾–3 shift control valve 190, 1–2 shift control valve 192, and end clutch valve 194. These four components receive pressure from shift control valve 94 and first and second pressure control valves 104 and 176. The second shift control section, consisting of these four components, feeds pressure to or exhausts pressure from the friction elements, i.e., front clutch 196, rear clutch 198, low/reverse brake 200, end clutch 202, and kickdown servo 204.

Generally, rear clutch release valve 98 connects to drive pressure conduit 52 for applying pressure to rear clutch 198 at the first speed of the "D" range. 1–2 shift valve 192 connects to second speed line 108 of shift control valve 94 so that drive pressure can be applied to kickdown servo 204 at the second speed of the "D" range. 2¾–3 shift valve 190 connects to third pressure line 110 in order to apply pressure to front clutch 196 and end clutch 202 at the third speed of the "D" range. Finally, in order to apply end clutch 202 and kickdown servo 204 at the fourth speed of the "D" range, rear clutch release valve 98 is controlled by pressure of fourth speed line 112 to obstruct pressure flowing to rear clutch 198, while pressure in third speed line 110 is directed to end clutch 202, and pressure in drive pressure conduit 52 is directed to kickdown servo 204.

As shown in FIG. 4, rear clutch release valve 98 includes seven ports. First and second ports 208 and 210 receive pressure from manual valve 12 through a reverse pressure conduit 206 at the "R" range. A third port 212 communicates with drive pressure conduit 52 to receive pressure from manual valve 12. A fourth port 214 communicates with fourth speed line 112 of shift control valve 94. A fifth port 216 connects to and controls 2¾–3 shift valve 190 by pressure coming through fourth port 214. A sixth port 218 communicates with and feeds pressure to rear clutch 198. A seventh port 220 communicates with front clutch 196. Rear clutch release valve 98 further includes a bypass line 222 for exhausting pressure at the fourth speed of the "D" range fed to the rear clutch at the third speed of the "D" range.

A valve spool 224 is located within rear clutch release valve 98 and has a first land 226, a second land 228 smaller than first land 226, and third, fourth, and fifth lands 230, 232, and 234 respectively. The function of these lands in connection with the ports of the rear clutch release valve will be described further herein. Valve spool 224 is biased by a spring 236.

2¾–3 shift valve 190 includes a first port 238 in communication with third speed line 110 of shift control valve 94. Second and third ports 240 and 242 of 2¾–3 shift valve 190 are in communication with first and second ports 208 and 210 of rear clutch release valve 98. A fourth port 244 communicates with and receives fluid pressure from fourth port 186 of second pressure control valve 176. A fifth port 246 receives pressure from 1–2 shift control valve 192 in order to release kickdown servo 204 at the third speed of the "D" range. A sixth port 248 applies pressure to front clutch 196, while a seventh port 250 is used to release kickdown servo 204. Finally, an eighth port 254 is connected to and receives pressure from fifth port 216 of rear clutch release valve 98. Pressure at eighth port 254 displaces a valve spool 252 to the left within 2¾–3 shift control valve 190 to ultimately release front clutch 196 at the fourth speed of the "D" range.

Valve spool 252 includes three lands, a first land 56, a second land 258, and a third land 260, and is biased by a spring 262. Pressure from third speed line 10 applies to first land 256. Second land 258 allows pressure coming through fourth port 244 to be exhausted through sixth port 248 at the third speed of the "D" range. Third land 260 allows pressure coming through fifth port 246 to be exhausted through seventh port 250 also at the third speed of the "D" range.

As shown in FIG. 4, 1–2 shift valve 192 includes five ports and a valve spool having three lands. A first port 264 directs pressure to kickdown servo 204 to apply the kickdown servo at the second and fourth speeds of the "D" range. A second port 266 directs pressure to low/reverse brake 200 at the "R" range. A third port 270 communicates with fourth port 166 of first pressure control valve 104 when valve spool 268 within 1–2 shift valve 192 is displaced by pressure from second speed line 108. A fourth port 272 receives fluid pressure from third port 100 of manual valve 272 receives fluid pressure from third port 100 of manual valve 12. A fifth port 274 is connected to second speed line 108 to allow pressure from line 108 to displace valve spool 268.

Valve spool 268 includes first, second, and third lands 276, 278, and 280 respectively. Pressure coming through fifth port 274 applies to first land 276 to displace valve spool 268 towards the right in the figures. Second land 278 opens second port 266 and fourth port 270 selectively. Third land 280 opens first port 264 and third port 270 selectively. Valve spool 268 is biased by a spring 282 at its right such that it is displaced towards the left at the first speed of the "D" range and towards the right at the other speed ranges, as will be described further herein.

End clutch valve 194 includes seven ports and a valve spool having three lands. First and second ports 284 and 286 are fed pressure from second pressure control valve 176. A third port 288 is connected to second speed line 108 of shift control valve 94. A fourth port 290 is connected to fourth speed line 112. A fifth port 292 directs pressure to end clutch 202. A sixth port 296 receives pressure from fourth speed line 112 and controls the displacement of a valve spool 294 within end clutch valve 194. A seventh port 298 directs pressure to front clutch 196.

Valve spool 294 has a first land 300 on which pressure coming through third port 288 acts to also control the displacement of valve spool 294. A second land 302 obstructs first port 284 selectively, and a third land 304 obstructs fourth port 290 selectively. Pressure from seventh port 298 acts on third land 304. Valve spool 294 is biased by a spring 306 at its right and abuts with a plug 308 to which pressure is applied from sixth port 296.

Operation of the Hydraulic Control System

In the hydraulic control system according to the present invention, the transmission control unit (TCU) controls the solenoid valves to ON/OFF states or according to a duty ratio based upon the throttle valve position and the vehicle road speed. In turn, the solenoids fluid pressure through the various valves and ultimately to the friction elements to operate the gear shifting.

The engine drives torque converter 2 which drives the transmission input shaft (not shown) and hydraulic pump 4. Pressure produced by hydraulic pump 4 is directed to pressure regulating valve 10, reducing valve 14, manual valve 12, and torque control valve 8 along line pressure conduit 46.

Pressure fed to pressure regulating valve 10 from line pressure conduit 46 is regulated as it comes through first and second ports 48 and 50. Valve spool 44 is pushed towards the left in the figures and some fluid is fed from exhaust port Ex back to oil pan 75.

As line pressure is fed to first port 82 of reducing valve 14, valve spool 90 is displaced to reduce the opening of first port 82 such that pressure lower than line pressure is produced from second port 84. This reduced pressure is fed through reduced pressure line 102 to first pressure control valve 104, second pressure control valve 176, N-R control valve 144, converter clutch regulator valve 6, and pressure regulating valve 10.

First Speed Operation of the "D" Range

Figure 5:
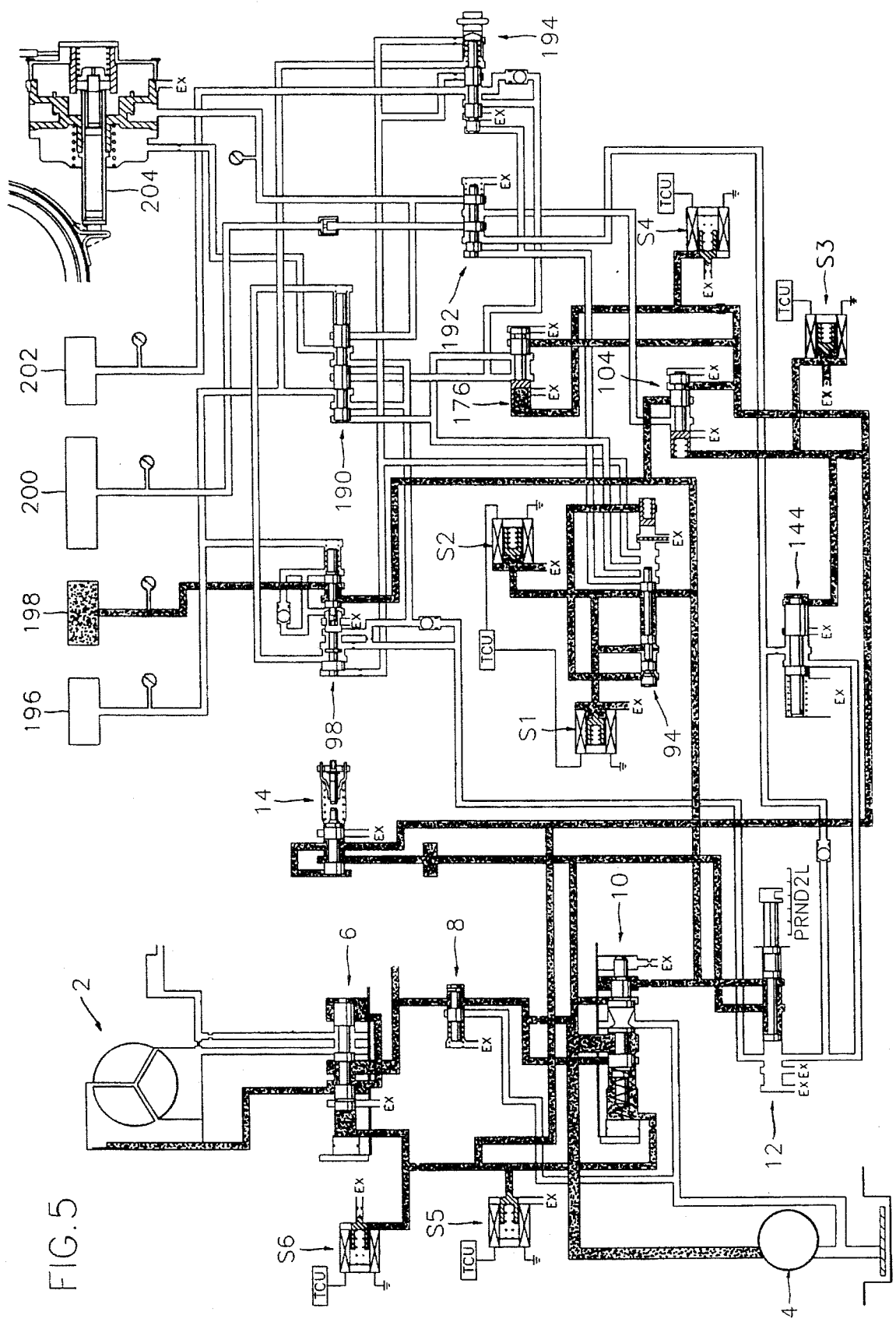
FIG. 5 is the hydraulic circuit diagram of FIG. 1 showing the operation of the control system during the first speed of a "D" range.

When the vehicle operator selects the "D" range of the shift select lever, manual valve 12 interconnected with the shift select lever is changed from a state shown in FIG. 1 to that shown in FIG. 5 and also in FIGS. 6–11 described further herein, the shaded areas of the fluid lines represent lines in which fluid is flowing during the particular operation depicted by the circuit diagram. As shown in FIG. 5, pressure coming through first port 92 and leaving through second port 96 of manual valve 12 is transmitted via drive pressure conduit 52 to first port 114 of shift control valve 94, third port 164 of first pressure control valve 104, and third port 212 of rear clutch release valve 98. Some fluid from second port 96 of manual valve 12 is fed to third port 54 of pressure regulating valve 10 to exert force on the right face of fourth land 68 and force valve spool 44 to the left.

During the first speed of the "D" range, shift control solenoid valves S1 and S2 and first pressure control solenoid valve S3 are controlled to ON states, and second pressure control solenoid valve S4 is controlled to an OFF state by the TCU. Pressure fed to rear clutch 198 is variably controlled by means of the duty control of line pressure varying solenoid valve S5. FIG. 12 charts the operation status of the solenoid valves for each mode. The five solenoid valves are controlled in order to apply only rear clutch 198 among the plurality of friction members to perform the first speed of the "D" range. The pressure feeding process to rear clutch 198 will now be explained with reference to FIG. 5.

The line pressure varying solenoid valve S5 is controlled according to a duty ratio to control pressure in line pressure conduit 46 and feed pressure required for gear shifting to drive pressure conduit 52. Because both shift control solenoid valves S1 and S2 are controlled to ON states, pressure coming through the first port 114 of shift control valve 94 is exhausted without establishing pressure in fifth, sixth, and eighth ports 124, 126, and 130.

Pressure on the left face of first land 140 displaces valve spool 122 until it is stopped by stopper 136. Second land 142 is then positioned between second port 116 and seventh port 128. Therefore, drive pressure cannot be fed to second, third, and fourth speed lines 108, 110, and 112. Drive pressure is only applied to third port 212 of rear clutch release valve 98. Pressure is not fed to the other ports of the rear clutch release valve 98. Valve spool 224 within rear clutch release valve 98 is displaced towards the left in the figures by spring 236. Because fourth land 232 of valve spool 224 is located to the left of third port 212, and fifth land 234 is located to the right of sixth port 218, pressure passing through drive pressure conduit 52 is directed through third port 212 and sixth port 218 to rear clutch 198 to apply rear clutch 198.

During this first speed of the "D" range, first pressure control solenoid valve S3 is controlled to an ON state. This causes pressure coming through first port 160 of first pressure control valve 104 to be released, and pressure coming through second port 162 to act on the right face of second land 174. Valve spool 168 is displaced towards the left causing second land 174 to obstruct third port 164 such that pressure coming to third port 164 stops there.

Also, because second pressure control solenoid valve S4 is controlled to an OFF state during the first speed of the "D" range, valve spool 178 of second pressure control valve 176 is displaced towards the right under the action of the force exerted by spring 188 and pressure coming through first port 180. Second port 182 is obstructed and pressure fed through the reduced pressure line 102 stops there.

Second Speed Operation of the "D" Range

As the vehicle speed and the throttle opening increase, the TCU starts to control shift control solenoid valve S2 to an OFF state and first pressure control solenoid valve S3 according to a duty ratio, as charted in FIG. 12 as the "1→2" operation mode.

Figure 6:
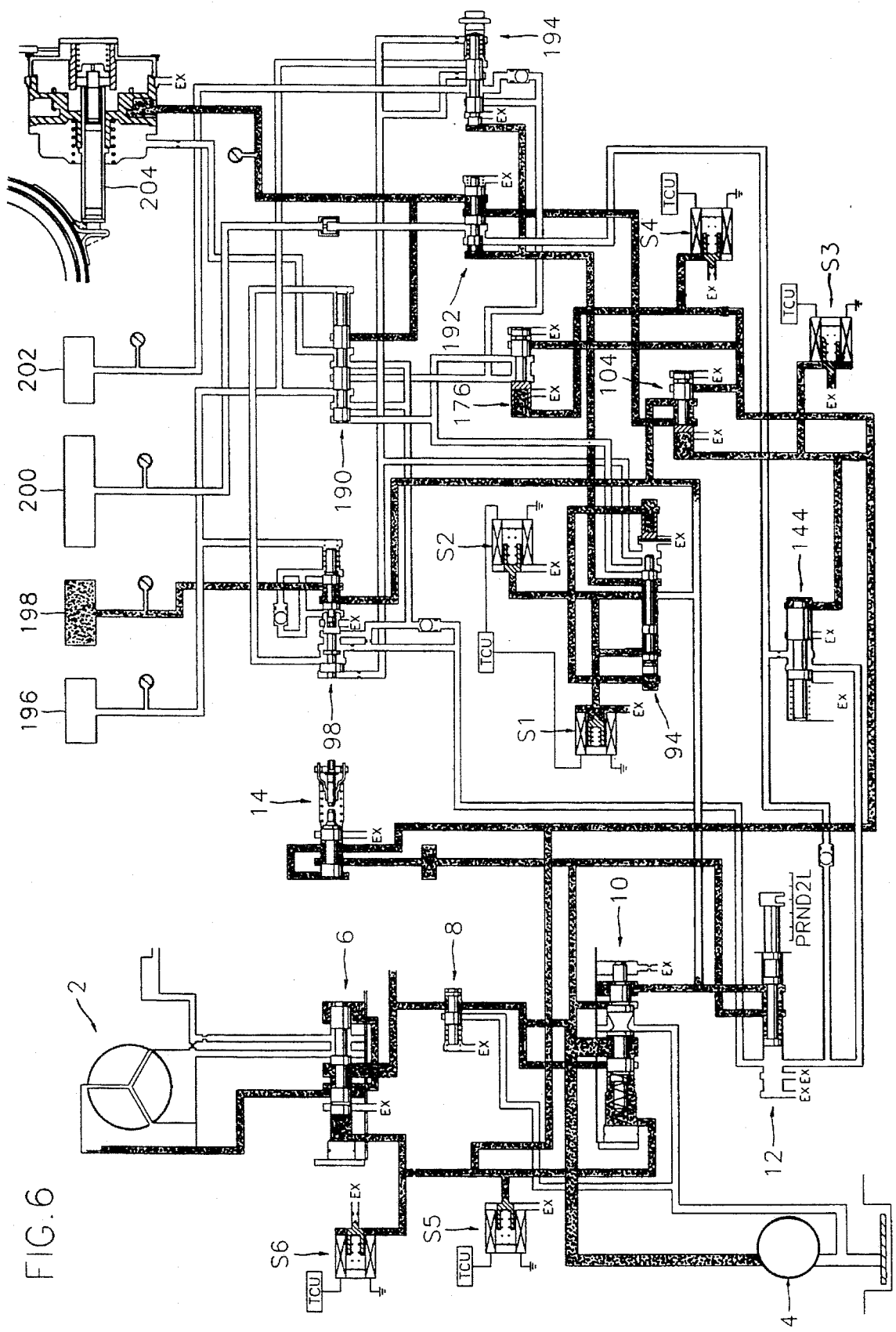
FIG. 6 is the hydraulic circuit diagram of FIG. 1 showing the operation of the control system during the second speed of the "D" range.

This control operates to shift from the first to the second speed and performs the second speed of the "D" range once the solenoid S3 is at an OFF state. As shift control solenoid valve S2 is controlled to an OFF state, pressure established at fifth and sixth ports 124 and 126 of shift control valve 94 exerts forces to displace plugs 132 and 134 to the positions limited by stoppers 136 and 138, respectively, as shown in FIG. 6. Accordingly, valve spool 122 is displaced towards the right so that second land 142 becomes located between second port 116 and third port 118. First port 114 then communicates with second speed line 108 to feed pressure to second speed line 108.

As a result, some of the fluid flowing through drive pressure conduit 52 is fed via second speed line 108 to fifth port 274 of 1–2 shift valve 192 and to third port 288 of end clutch valve 194 to exert forces on valve spools 268 and 294, respectively. Pressure coming through fifth port 274 of 1–2 shift valve 192 exerts force on left face of first land 276 to displace valve spool 268 towards the right. Pressure coming through third port 288 of end clutch valve 194 exerts force on the left face of first land 300 to displace valve spool 294 towards the right.

Because first pressure control solenoid valve S3 is controlled according to a duty ratio from an ON state to an OFF state, pressure coming through first port 160 of first pressure control valve 104 increases gradually to displace valve spool 168 towards the right. Accordingly, third port 164 communicates with fourth port 116 and pressure in drive pressure conduit 52 is fed to third port 270 of 1–2 shift control valve 192. Because valve spool 268 of 1–2 shift control valve 192 is displaced towards the right, third port 270 and first port 264 are in communication with each other such that drive pressure is fed to kickdown servo 204 to apply the kickdown servo.

Performance of the second speed is accomplished because rear clutch 198 has been applied since the first speed, and first pressure control solenoid valve S3, which has been controlled by the TCU according to a duty ratio, is turned to an OFF state.

Third Speed Operation of the "D" Range

As the vehicle speed and the throttle opening increase further, the TCU starts to control the shift control solenoid valve S1 to an OFF state and first and second pressure control solenoid valves S3 and S4 according to duty ratios, as charted in FIG. 12 as the "2→3" operation mode. This control operates to shift from the second to the third speed.

Because shift control solenoid valves S1 and S2 are in OFF states, pressure is established at fifth, sixth and eighth ports 124, 126, and 130 of shift control valve 94. Valve spool 122 is displaced to a position where it contacts plug 134 by pressure exerting force on the left face of first land 140. As a result, second land 142 of valve spool 122 becomes located between third port 118 and fourth port 120 to enable second speed line 108 and third speed line 110 to communicate with first port 114. Drive pressure is thus fed to the second and third speed lines.

As in second speed operation, drive pressure coming through first port 114 of shift control valve 94 is fed via second speed line 108 to 1–2 shift control valve 192 and end clutch valve 194. Because pressure from third speed line 110 is fed to first port 238 of 2¾–3 shift valve 190, valve spool 252 is displaced towards the right and fourth port 244 and sixth port 248 communicate with each other. As such, some of the fluid in third speed line 110 is directed via third and fourth ports 184 and 186 of second pressure control valve 176 to front clutch 196 and seventh port 298 of end clutch valve 194.

The fluid directed to end clutch valve 194 causes the right and left of valve spool 294 of end clutch valve 194 to be subjected to a same pressure. Valve spool 294 is then displaced towards the left because first land 300 is smaller than third land 304. At this state, some of the pressure that passes through third and fourth ports 184 and 186 of second pressure control valve 176, and that is fed to end clutch valve 194, flows to end clutch 202 via second and fifth ports 286 and 292 of end clutch valve 194.

Figure 7:
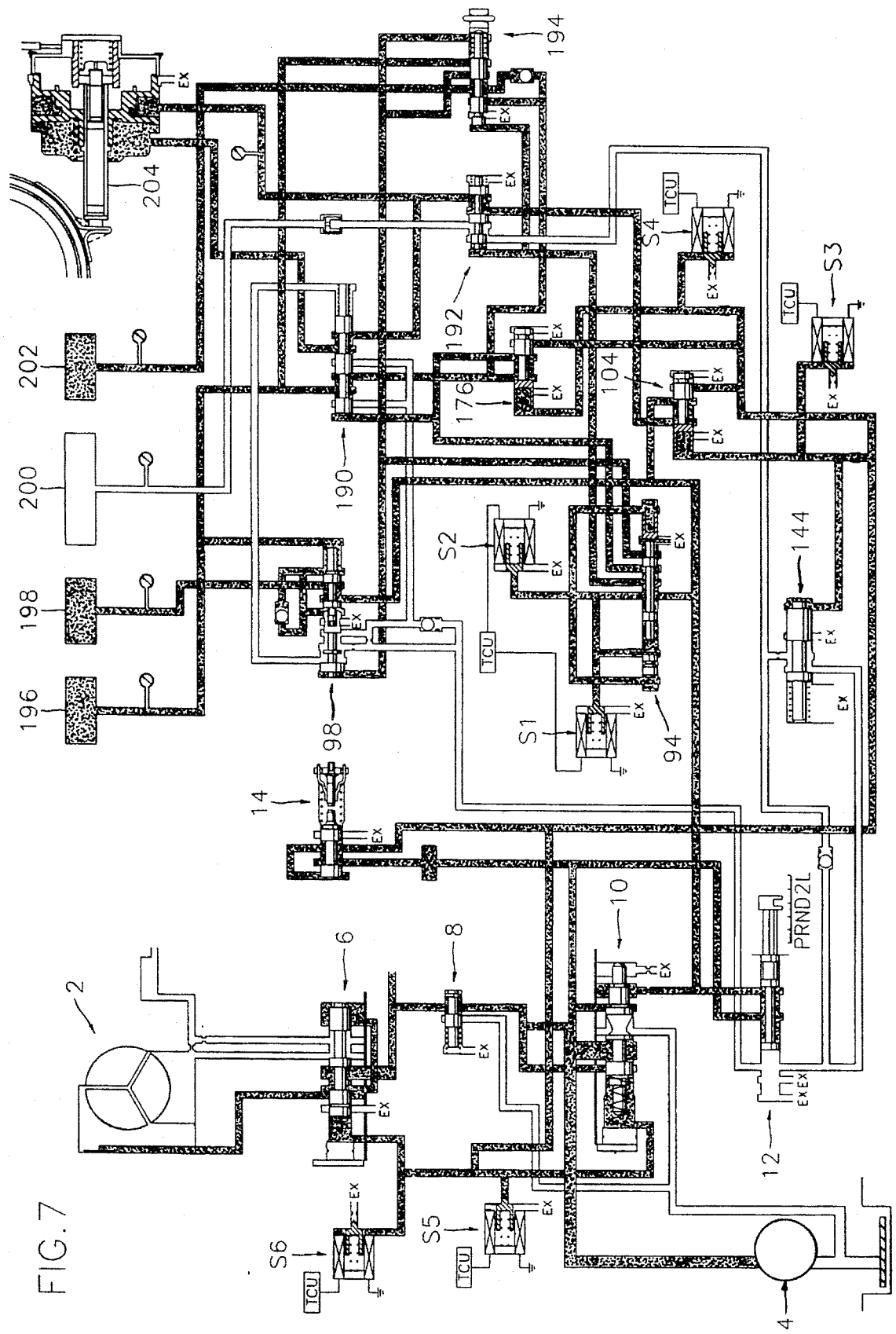
FIG. 7 is the hydraulic circuit diagram of FIG. 1 showing the operation of the control system during the third speed of the "D" range.

Even though application of rear clutch 198 is continued during this operation, application of kickdown servo 204 is release in order to accomplish the third speed. As shown in FIG. 7, because first pressure control solenoid valve S3 is controlled by the TCU to an OFF state according to a duty ratio, drive pressure is obstructed at port 162 of first pressure control valve 104. Valve spool 268 of 1–2 shift control valve 192 is displaced towards the right allowing pressure to be applied to kickdown servo 204. Some of the fluid passes through fifth and seventh ports 246 and 250 of 2¾–3 shift control valve 190 and ultimately to kickdown servo 204 in order to release e kickdown servo 204. This state is used as an emergency mode when the TCU or electronic circuitry is malfunctioning.

Fourth Speed Operation of the "D" Range

Figure 8:
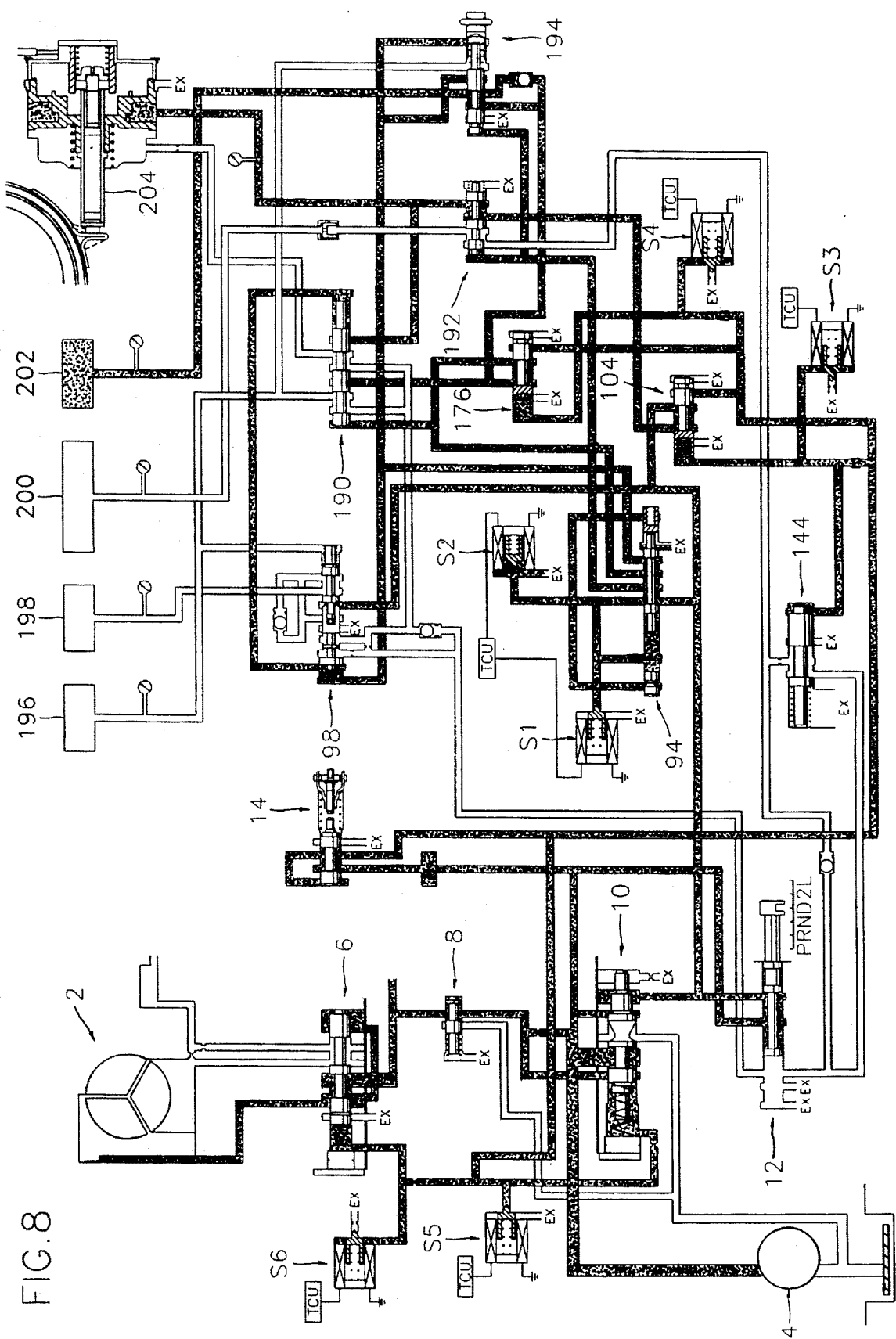
FIG. 8 is the hydraulic circuit diagram of FIG. 1 showing the operation of the control system during the fourth speed of the "D" range.

FIG. 8 diagrams the operation of the hydraulic control system during the fourth speed of the "D" range. As the vehicle speed and the throttle opening increase at the third speed, the TCU controls shift control solenoid valve S2 to an On state and first pressure control solenoid valve S3 according to a duty ratio, as charted in FIG. 12 as the "3→4" operation mode.

Because pressure at fifth and sixth ports 124 and 126 of shift control valve 94 is released, and pressure at eighth port 130 is not released, valve spool 122 pushes plug 134 and is fully displaced towards the right. Accordingly, drive pressure is fed to second, third, and fourth speed lines 108, 110, and 112 simultaneously. In order to accomplish the fourth speed, end clutch 202 and kickdown servo 204 should be applied, and front clutch 196 and rear clutch 198, which have been applied at the third speed, should be released.

Application of end clutch 202 is the same as that in the third speed, and application of kickdown servo 204 is the same s that in the second speed.

Pressure applied to front clutch 196 during the third speed is not longer fed to sixth port 248 of 2¾–3 shift valve 190. Some of the pressure from the fourth speed line 112 goes through fourth port 214 of rear clutch release valve 98. This pressure leaves through fifth port 216 and is fed to eighth port 254 of 2¾–3 shift control valve 190. Valve spool 252 of 2¾–3 shift control valve 190 is then displaced towards the left such that sixth port 248 communicates with second port 240 and seventh port 250 communicates with third port 242. The front clutch applying pressure and kickdown releasing pressure are stopped at fourth port 244 and fifth port 246 respectively. These pressures are fed via reverse pressure line 206 to manual valve 12 and returned to oil pan 75 through port Ex of manual valve 12.

Pressure fed to rear clutch 198 to apply the same during the third speed is exhausted through exhaust port Ex of rear clutch release valve 98. As a result of these operations, the fourth speed is completed and the vehicle is driven at its maximum speed.

During these shifting operations, damper clutch control solenoid valve S6 is controlled to ON/OFF states in accordance with the application of the damper clutch control valve to connect or disconnect torque converter 2 to the engine output shaft. Line pressure varying solenoid valve S5 controls line pressure during driving operation. Line pressure is increased if each friction element slips and is reduced if not in order to improve power train efficiency and hydraulic pump efficiency by maintaining gear shifting with the most suitable pressure.

Operation of Skip Shifting From Second to Fourth Speed

Figure 9:
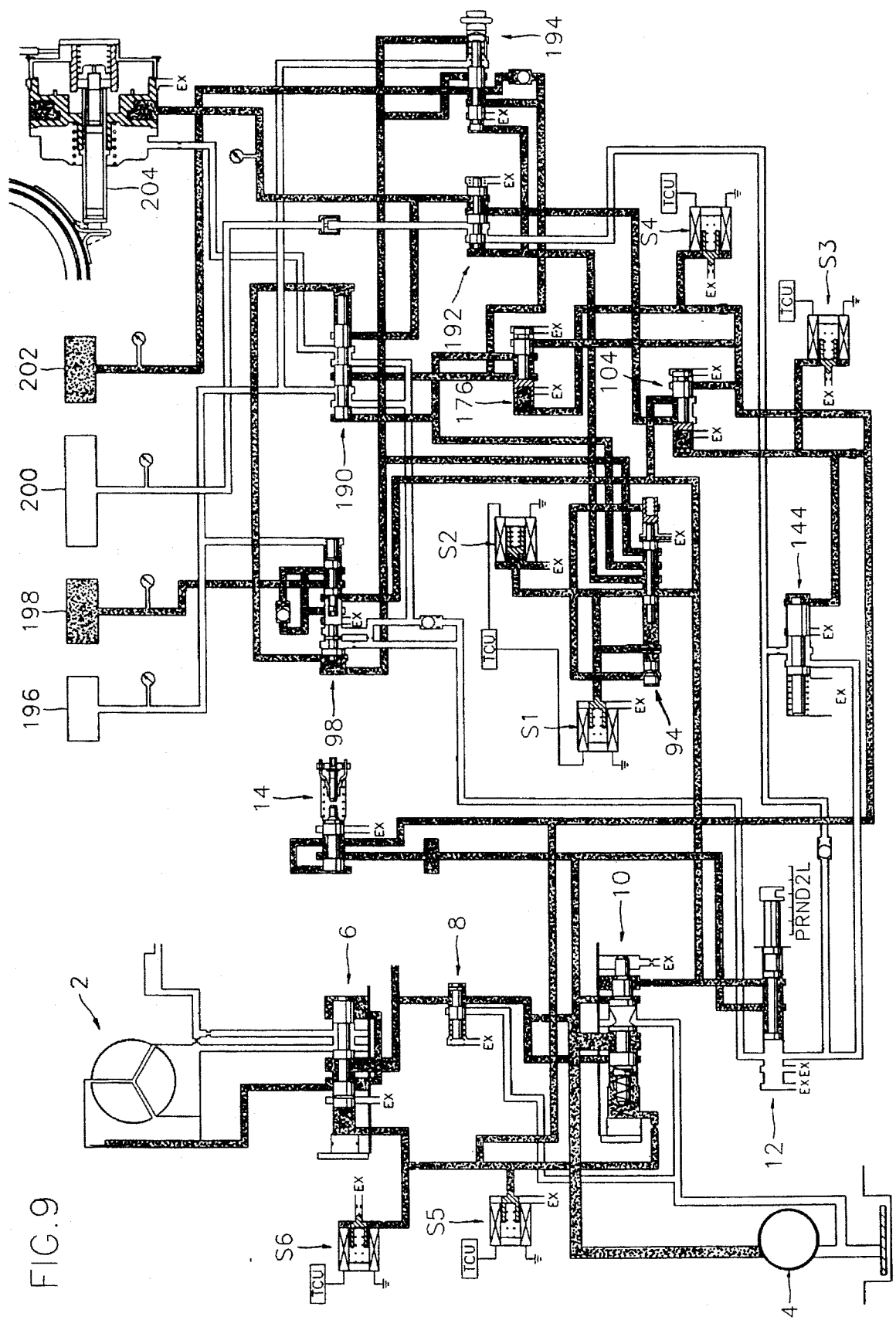
FIG. 9 is the hydraulic circuit diagram of FIG. 1 showing the operation of the control system during second-to-fourth skip shifting.

FIG. 9 diagrams the operation of the hydraulic control system according to the present invention during skip shifting from the second speed to the fourth speed without entering the third speed operation. While application of the rear clutch 198 is released and application of kickdown servo 204 is continued, end clutch 202 is applied in the second-to-fourth skip shifting.

As the vehicle speed and the throttle opening increase significantly and abruptly while driving at the second speed, the TCU controls shift control solenoid valve S1 from an ON state to an OFF state and shift control solenoid valve S2 from an OFF state to an ON state, as charted in FIG. 12 as the "2→4" operation mode.

Also in this mode, second pressure control solenoid valve S4 is controlled according to a duty ratio. Pressure in fourth speed line 112 is fed to end clutch control valve 194 to exert force on plug 308. Accordingly, port 284 and port 292 of end clutch control valve 194 communicate with each other to control and feed pressure for applying end clutch 202. The application of pressure to kickdown servo 204 is performed by displacing valve spool 168 of first pressure control valve 104 towards the right by means of first pressure control solenoid valve S3 controlled according to a duty ratio. Drive pressure is fed via third port 164 and fourth port 166 of control valve 104 to third port 270 of 1–2 shift control valve 192.

Pressure from second speed line 108 displaces valve spool 268 of 1–2 shift control valve 192 towards the right. Third port 270 thus communicates with first port 264 and pressure is fed to apply kickdown servo 204.

As valve spool 224 of rear clutch release valve 98 is displaced towards the right by pressure in fourth speed line 112, pressure applied to rear clutch 198 comes through sixth port 218 and is exhausted via bypass line 222 to exhaust port Ex. Thus, application of rear clutch 198 is released and operation of the fourth speed mode of the "D" range is accomplished.

During this fourth speed mode, third speed control pressure and fourth speed control pressure are fed to the right and left detecting chambers of 2¾–3 shift control valve 190, and valve spool 252 is biased towards the left by spring 262.

Operation of Skip Shifting From Fourth to Second Speed

To skip shift from the fourth to the second speed, pressure applied to end clutch 202 should be released and pressure should by applied to rear clutch 198. To this end and as charted in FIG. 12 as the "4→2" operation mode, the TCU controls the shift control solenoid valve S1 to the ON state, shift control solenoid valve S2 to the OFF state, second pressure control solenoid valve S4 according to a duty ratio, and line pressure varying solenoid valve S5 to the OFF state to increase line pressure.

During this operation, some of the fluid in drive pressure conduit 52 is fed to third port 212 of rear clutch release valve 98. As pressure in fourth speed line 112 is obstructed and valve spool 224 is placed towards the left by spring 236, pressure in third port 212 is fed via sixth port 218 to rear clutch 198.

At the same time, some of the fluid in drive pressure conduit 52 is fed to third port 164 of first pressure control valve 104. As first pressure control solenoid valve S3 is controlled to the OFF state and valve spool 168 of first pressure control valve 104 is displaced towards the right such that third port 164 communicates with fourth port 166, drive pressure is fed to third port 270 of 1–2 shift control valve 192.

Because valve spool 268 of 1–2 shift control valve 192 is displaced towards the right, third port 270 and first port 264 are in communication with each other and pressure is fed to kickdown servo 204 to apply kickdown servo 204.

Because valve spool 294 of end clutch valve 194 is displaced towards the right by pressure from second speed line 108, pressure applied to end clutch 202 at the fourth speed enters through fifth port 292 and is fed via the fourth port 290 to fourth port 120 of shift control valve 94. Because shift control solenoid valves S1 and S2 are controlled to the ON state and the OFF state, respectively, second land 142 of valve spool 122 of shift control valve 94 is located between second port 116 and third port 118. Thus, the pressure coming through fourth port 120 from end clutch valve 194 is exhausted through exhaust port Ex of shift control valve 94. Thereby, the application of pressure to end clutch 202 is released and the shift from the fourth to the second speed is performed.

"R" Range Operation

Figure 10:
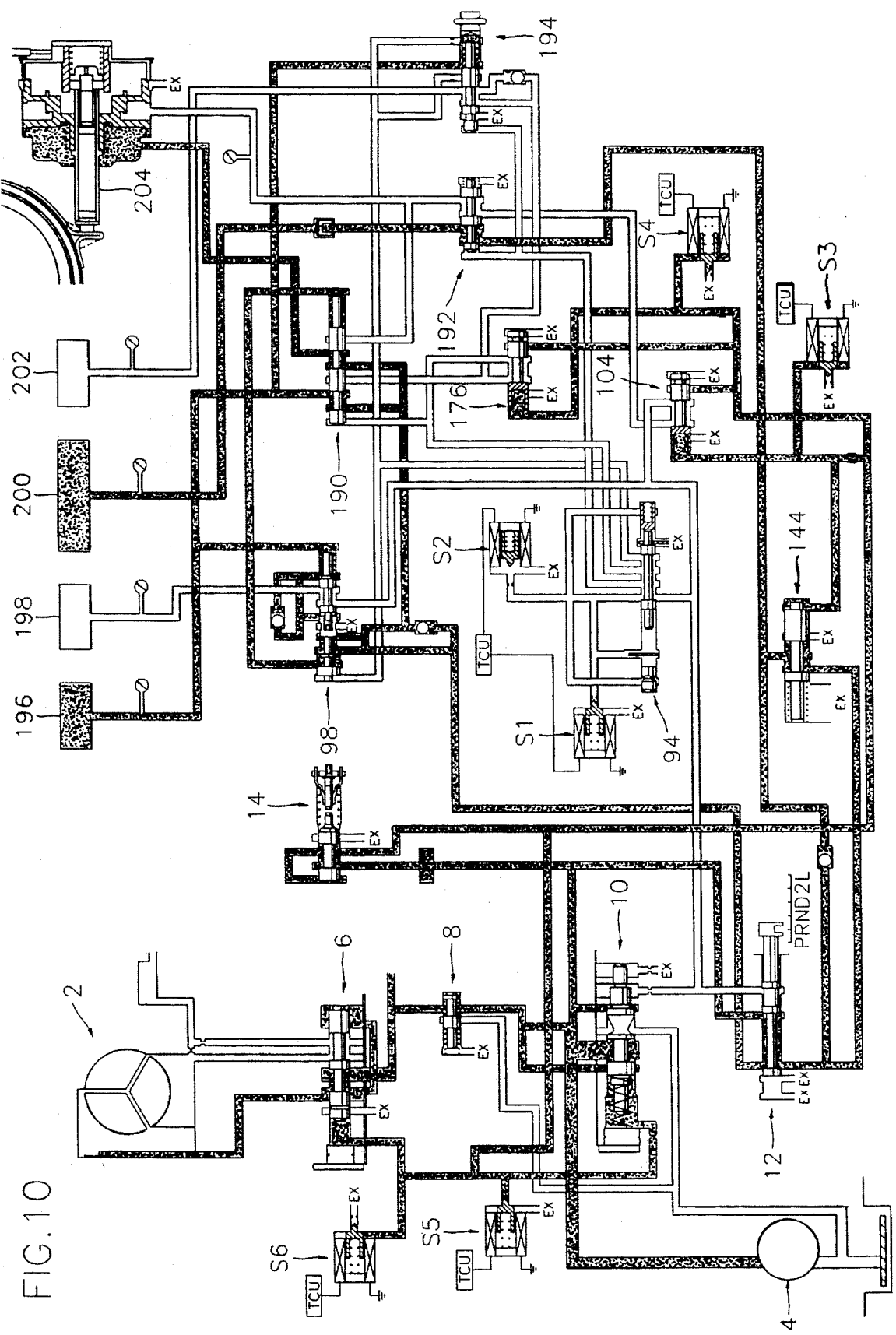
FIG. 10 is the hydraulic circuit diagram of FIG. 1 showing the operation of the control system during the "R" range.

When the shift select lever is selected to the "R" range, the valve spool of manual valve 12 is displaced to a position shown in FIG. 10. To drive the vehicle in reverse, pressure must be fed to front clutch 196 and low/reverse brake 200. In the reverse mode, the TCU controls all of the solenoid valves to OFF states, as charted in FIG. 12 as the "REV" mode.

As shown in FIG. 10, pressure from hydraulic pump. 4 comes through first port 92 of manual valve 12 and is fed via third port 100 to reverse pressure conduit 206. Pressure fed through reverse pressure conduit 206 comes through first port 208 of rear clutch release valve 98 and is fed via fifth port 216 to eighth port 254 of 2¾–3 shift control valve 190. Pressure coming through eighth port 254 displaces valve spool 252 towards the left. Second port 240 thus communicates with sixth port 248 to feed some of the fluid passing through reverse pressure conduit 206 to front clutch 196.

Some of the fluid in manual valve 12 is also fed to N-R control valve 144 and 1–2 shift control valve 192, as shown in FIG. 10. Because first pressure control solenoid valve S3 is in the OFF state, pressure in first port 150 of N-R control valve 144 is increased to displace valve spool 146 towards the left. As a result, second port 152 and third port 154 of N-R control valve 144 communicate with each other and line pressure is fed to fourth port 272 of 1–2 shift control valve 192. This pressure acts on first land 276 and second land 278 of valve spool 268, and, because second land 278 is bigger than first land 276, valve spool 268 is displaced towards the right. Accordingly, fourth port 272 and second port 266 of 1–2 shift control valve 192 communicate with each other, and pressure is fed to low-reverse brake 200.

"L" Range Operation

The shift select lever is shifted to the "L" range when engine brake is required. In this case, the valve spool of manual valve 12 is displaced to a position shown in FIG. 11. Pressure from hydraulic pump 4 comes through first port 92 of manual valve 12 and leaves through second port 96. This pressure is fed via drive pressure conduit 52 to first pressure control valve 104 and rear clutch release valve 98.

During the low mode of operation, the TCU controls the shift control solenoid valves S1 and S2 to ON states, second pressure control solenoid valve S4 to an OFF state, and first pressure control solenoid valve S3 and line pressure varying solenoid valve S5 according to duty ratios, as charted in FIG. 12 as the "N→LOW" operation mode. Because land 142 of shift control valve 94 is positioned between second port 116 and seventh port 128, pressure passing through drive pressure conduit 52 to port 114 is not fed to second, third, and fourth speed lines 108, 110, and 112. That pressure is fed to third port 212 of rear clutch release valve 98. Valve spool 224 of rear clutch release valve 98 is displaced towards the left, allowing pressure to be fed via sixth port 218 to rear clutch 198.

Figure 11:
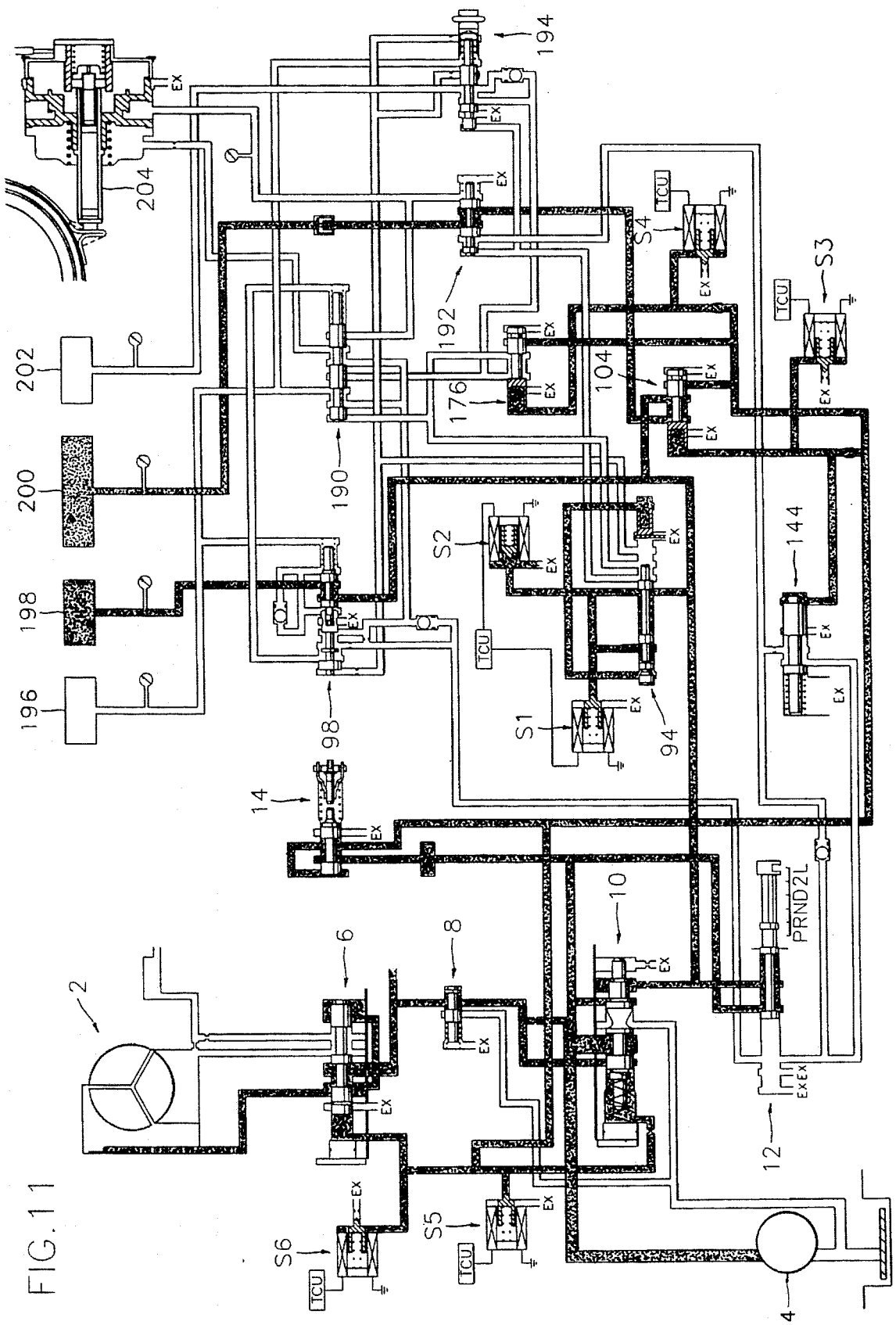
FIG. 11 is the hydraulic circuit diagram of FIG. 1 showing the operation of the control system during the "2" range.

Some of the fluid in drive pressure conduit 52 is fed to third port 164 of first pressure control valve 104, as shown in FIG. 11. Pressure reduced at reducing valve 14 by first pressure control solenoid valve S3 is increased at first port 160 of first pressure control valve 104. Valve spool 168 is displaced towards the right and third port 164 and fourth port 166 communicate with each other to allow drive pressure to be fed to third port 270 of 1–2 shift control valve 192. Because no pressure is fed to other ports of 1–2 shift control valve 192, valve spool 268 is displaced towards the left by spring 282. This allows pressure coming through third port 270 to be fed via second port 266 to low/reverse brake 200, thus enabling the engine brake at the "L" range.

As explained and illustrated, the hydraulic control system according to the present invention improves shifting responsiveness by performing the fourth-to-second skip shifting and the second-to-fourth skip shifting. The hydraulic pump efficiency and, hence, the power train efficiency are improved because line pressure is varied by the line pressure varying solenoid valve controlled according to a duty ratio. Shift feeling during N-D shifting or N-R shifting is improved by controlling the line pressure varying solenoid valve S5 according to the duty ratio.

It will be apparent to those skilled in the art that various modifications and variations can be made in the hydraulic control system of the present invention and in construction of this system without departing from the scope or spirit of the invention.

Other embodiment of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hydraulic control system for an automatic transmission, comprising:

a hydraulic pump for pressurizing fluid;

a torque converter for transmitting power to the transmission;

a pressure regulating valve connected to the hydraulic pump for varying line pressure according to an operation of a line pressure varying solenoid valve, the solenoid valve being controlled according to a duty ratio by a transmission control unit;

a reducing valve connected to the hydraulic pump for reducing a fluid flow;

a manual valve operated by a shift select lever for feeding pressure from the pump to selectively a drive pressure conduit at a "D" range and a reverse pressure conduit at an "R" range, the "D" range including a plurality of speeds;

a shift control valve connected to the drive pressure conduit for feeding drive pressure downstream by an operation of two shift control solenoid valves which are ON/OFF controlled by the transmission control unit;

a rear clutch release valve for feeding pressure from the drive pressure conduit to a rear clutch at a first, a second, and a third speed of the "D" range;

a first pressure control valve controlled by a first pressure control solenoid valve according to a duty ratio in order to feed pressure from the drive pressure conduit to a kickdown servo at the second and fourth speeds of the "D" range;

a second pressure control valve controlled by a second pressure control solenoid valve according to a duty ratio in order to feed pressure to a front clutch and to an end clutch at the third speed of the "D" range;

a 1–2 shift valve for receiving pressure from the shift control valve and feeding the pressure to the kickdown servo in accordance with a second speed line pressure of the shift control valve;

an end clutch valve for receiving pressure from the shift control valve and feeding the pressure to the front clutch and the end clutch in accordance with the second speed line pressure; and a 2¾–3 shift valve for receiving pressure from the shift control valve and for releasing pressure from the kickdown servo and feeding pressure to the front clutch operated in accordance with a third and a fourth speed line pressure of the shift control valve.

2. The hydraulic control system according to claim 1, wherein, at the first speed of the "D" range, the first pressure control solenoid valve is controlled to an ON state in order to keep pressure in the drive pressure conduit from flowing into the 1–2 shift valve, and the second pressure control solenoid valve is controlled to an OFF state.

3. The hydraulic control system according to claim 1, wherein the first pressure control solenoid valve is controlled according to a duty ratio at the second speed of the "D" range in order to feed pressure in the drive pressure conduit, via 1–2 shift valve, to the kickdown servo to apply the kickdown servo.

4. The hydraulic control system according to claim 1, wherein in order to perform a second-to-fourth skip shifting a second, a third, and a fourth speed line of the shift control valve are opened and the first pressure control solenoid valve is controlled according to a low duty ratio in order to feed pressure from the drive pressure conduit to the 1–2 shift valve, the 1–2 shift valve is controlled by the second speed line pressure in order to feed the drive pressure to the kickdown servo, the third and fourth speed line pressure are fed to the 2¾–3 shift valve such that a valve spool of the 2¾–3 shift valve is displaced to cause some of the fluid pressure in the third speed line to be fed via the second pressure control valve and the end clutch valve to the end clutch, and rear clutch pressure is released by the rear clutch release valve.

5. The hydraulic control system according to claim 1, wherein, in order to perform a fourth-to-second skip shifting, a second speed line of the shift control valve is opened to control the 1–2 shift valve such that pressure is directed to the kickdown servo and pressure is fed to the rear clutch directly, and the end clutch pressure is released by the second pressure control valve.

6. A hydraulic control system for an automatic transmission, comprising:

a shift control section including a plurality of supply valves for selectively feeding line pressure to a plurality of friction members for selecting a gear of the transmission;

a line pressure control section for supplying line pressure from a hydraulic pump to the shift control section via a drive pressure conduit;

a shift control valve within the shift control section for selectively feeding the line pressure to the plurality of supply valves within the shift control section; and a plurality of solenoid valves controlled by a transmission control unit for operating the shift control valve and the plurality of supply valves so that the automatic transmission can skip between a second gear and a fourth gear;

wherein the plurality of friction members include a front clutch to be applied during a third speed and a reverse mode of operation of the transmission, a rear clutch to be applied during a first speed, a second speed, the third speed, and a low mode of operation of the transmission, a low/reverse brake to be applied during the low and reverse modes of operation of the transmission, an end clutch to be applied during the third speed and a fourth speed of the transmission, and a kickdown servo to be applied during the second and fourth speeds of the transmission.

7. The hydraulic control system according to claim 6, wherein the plurality of supply valves includes a 1–2 shift control valve for selectively applying pressure to the low/reverse brake and the kickdown servo, a 2¾–3 shift control valve for selectively applying pressure to the front clutch and for releasing pressure to the kickdown servo, a rear clutch release valve for selectively applying pressure to the rear clutch, an end clutch release valve for selectively applying pressure to the front clutch and the end clutch, a first pressure control valve for selectively applying pressure to the 1–2 shift control valve, and a second pressure control valve for selectively applying pressure to the end clutch valve and the 2¾–3 shift control valve.

8. The hydraulic control system according to claim 7, wherein the plurality of solenoid valves includes a pair of shift control solenoid valves for electronically controlling the operation of the shift control valve, a first pressure control solenoid valve for electronically controlling the operation of the first pressure control valve, and a second pressure control solenoid valve for electronically controlling the second pressure control valve.

9. The hydraulic control system according to claim 8, wherein, when the transmission skips from second to fourth gear, the first pressure control solenoid valve controls the first pressure control valve so that pressure is fed to the kickdown servo via the 1–2 shift valve, the second pressure control solenoid valve controls the second pressure control valve so that pressure is fed to the end clutch via the end clutch valve, and fluid pressure is released from the rear clutch by the rear clutch release valve.

10. The hydraulic control system according to claim 8, wherein, when the transmission skips from fourth to second gear, the first pressure control solenoid valve controls the first pressure control valve so that pressure is fed to the kickdown servo via the 1–2 shift valve, fluid pressure from the drive pressure conduit is fed to the rear clutch via the rear clutch release valve, and fluid pressure is released from the end clutch by the second pressure control valve.

\* \* \* \* \*